United States Patent [19]
Heying et al.

[11] Patent Number: 6,121,368
[45] Date of Patent: Sep. 19, 2000

[54] SILICONE COMPOSITION AND SILICONE PRESSURE SENSITIVE ADHESIVE FORMED THEREFROM

[75] Inventors: Michael David Heying, Lafayette, Ind.; Michael Andrew Lutz, Hope, Mich.; Patricia Kathryn Moline, Lansing, Mich.; Michael John Watson, Midland, Mich.

[73] Assignee: Dow Corning Corporation, Midland, Mich.

[21] Appl. No.: 09/391,874

[22] Filed: Sep. 7, 1999

[51] Int. Cl.$^7$ ................ C08K 5/01; C08K 3/36
[52] U.S. Cl. ............ 524/493; 525/478; 524/266; 524/268; 524/312; 524/313; 524/388; 524/383; 524/503; 524/506
[58] Field of Search ............ 524/493, 266, 524/268, 312, 313, 388, 383, 503, 506; 525/478

[56] References Cited

U.S. PATENT DOCUMENTS

| | | | |
|---|---|---|---|
| 4,988,779 | 1/1991 | Medford et al. | 525/478 |
| 5,232,702 | 8/1993 | Pfister et al. | 424/448 |
| 5,328,696 | 7/1994 | Noel | 424/449 |
| 5,658,975 | 8/1997 | Ulman et al. | 524/266 |

Primary Examiner—Margaret G. Moore
Attorney, Agent, or Firm—Larry A. Milco

[57] ABSTRACT

A silicone composition for preparing a silicone pressure sensitive adhesive, the composition comprising (A) 20 to 55 parts by weight of a polydiorganosiloxane containing an average of at least two silicon-bonded alkenyl groups per molecule; (B) 45 to 80 parts by weight of an organopolysiloxane resin comprising $R^3{}_3SiO_{1/2}$ units and $SiO_{4/2}$ units wherein each $R^3$ is independently selected from the group consisting of monovalent hydrocarbon and monovalent halogenated hydrocarbon groups, the mole ratio of $R^3{}_3SiO_{1/2}$ units to $SiO_{4/2}$ units is from 0.6:1 to 1.5:1, the resin contains less than about 2 mole percent of alkenyl groups, and the total amount of components (A) and (B) is 100 parts by weight; (C) an organohydrogenpolysiloxane having an average of at least two silicon-bonded hydrogen atoms per molecule in an amount sufficient to cure the composition; (D) a thixotropic agent in an amount sufficient to impart thixotropy to the composition; and (E) a catalytic amount of a hydrosilylation catalyst; wherein the sum of the average number of silicon-bonded alkenyl groups per molecule in component (A) and the average number of silicon-bonded hydrogen atoms per molecule in component (C) is greater than 4. A silicone pressure sensitive adhesive comprising a reaction product of the silicone composition. A multi-part silicone composition comprising components (A) through (E) in two or more parts, provided neither component (A) nor component (B), when components (B) contains alkenyl groups, are present with components (C) and (E) in the same part.

31 Claims, No Drawings

SILICONE COMPOSITION AND SILICONE PRESSURE SENSITIVE ADHESIVE FORMED THEREFROM

FIELD OF THE INVENTION

The present invention relates to a silicone composition for preparing a silicone pressure sensitive adhesive and more particularly to an addition-curable silicone composition containing a thixotropic agent. The present invention also relates to a silicone pressure sensitive adhesive produced from such composition.

BACKGROUND OF THE INVENTION

Silicone pressure sensitive adhesives, hereinafter also referred to as silicone PSAs, are useful in a variety of applications by virtue of their unique properties, including excellent adhesive and cohesive strength, high tack, very low alpha particle emissions, good moisture resistance, good electrical properties, high ionic purity, and good adhesion to low energy substrates. For example, silicone PSAs are widely used in adhesive tapes, bandages, low-temperature backings, transfer films, and labels. Moreover, silicone PSAs are used in the assembly of automotive parts, toys, electronic circuits, and keyboards.

Addition-curable silicone compositions useful for preparing silicone pressure sensitive adhesives are known in the art. For example, silicone compositions containing an alkenyl-containing polydiorganosiloxane, an organopolysiloxane resin, an organohydrogenpolysiloxane, and a hydrosilylation catalyst are disclosed in U.S. Pat. No. 5,290,885 to Vincent et al.; U.S. Pat. No. 5,366,809 to Schmidt et al.; U.S. Pat. No. 3,983,298 to Hahn et al.; U.S. Pat. No. 5,399,614 to Lin et al.; U.S. Pat. No. 5,100,976 to Hamada et al.; U.S. Pat. No. 5,446,532 to Wengrovius et al.; U.S. Pat. No. 4,774,297 to Murakami et al.; U.S. Pat. No. 4,988,779 to Medford et al.; and U.S. Pat. No. 5,292,586 to Lin et al.

However, conventional silicone PSA compositions exhibit little or no thixotropy, rendering them unsuitable for some applications, such as fabrication of certain electronic packages, that require formation of adhesive deposits having critical dimensions on well-defined regions of a substrate. Under the shear conditions typically encountered during application, viscous silicone PSA compositions exhibit a pronounced tendency to adhere to the surface of the dispenser or coating device, forming a continuous string of adhesive between the device and the deposit. This condition, referred to herein as "stringing", can result in contamination of the substrate. Although, stringing is less conspicuous in the case of lower viscosity silicone PSA compositions, such compositions may sag or flow beyond the initial boundaries of the deposit. Furthermore, relatively thick films cannot be readily prepared in a single application from low viscosity silicone PSA compositions.

For the reasons stated above there is a need for a thixotropic addition-curable silicone composition that cures to form a pressure sensitive adhesive.

SUMMARY OF THE INVENTION

The present invention is directed to a silicone composition for preparing a silicone pressure sensitive adhesive, the composition comprising:

(A) 20 to 55 parts by weight of a polydiorganosiloxane containing an average of at least two silicon-bonded alkenyl groups per molecule;

(B) 45 to 80 parts by weight of an organopolysiloxane resin comprising $R^3_3SiO_{1/2}$ units and $SiO_{4/2}$ units wherein each $R^3$ is independently selected from the group consisting of monovalent hydrocarbon and monovalent halogenated hydrocarbon groups, the mole ratio of $R^3_3SiO_{1/2}$ units to $SiO_{4/2}$ units is from 0.6:1 to 1.5:1, the resin contains less than about 2 mole percent of alkenyl groups, and the total amount of components (A) and (B) is 100 parts by weight;

(C) an organohydrogenpolysiloxane having an average of at least two silicon-bonded hydrogen atoms per molecule in an amount sufficient to cure the composition;

(D) a thixotropic agent in an amount sufficient to impart thixotropy to the composition, wherein the agent is selected from the group consisting of (1) at least one silica filler having an average surface area of from 50 to 400 $m^2/g$; and (2) a mixture comprising (a) at least one silica filler having an average surface area of from 0.5 to 400 $m^2/g$; and (b) an additive selected from the group consisting of (i) at least one organopolysiloxane containing an average of at least two silicon-bonded hydroxyl groups and from about 4 to about 40 silicon atoms per molecule, (ii) a reaction product of at least one organopolysiloxane containing an average of at least two silicon-bonded hydroxyl groups and from about 4 to about 40 silicon atoms per molecule, and at least one silane containing at least one silicon-bonded alkoxy group and at least one silicon-bonded epoxy-containing organic group per molecule, (iii) at least one polyether, (iv) at least one poly(vinyl alcohol), (v) at least one polysaccharide, (vi) at least one triester of glycerol, (vii) at least one hydrocarbon free of aliphatic unsaturation, and (viii) a mixture comprising at least two of the aforementioned additives, provided that when the additive is (vii), the composition contains an effective amount of at least one silica filler having a surface area of from 50 to 400 $m^2/g$; and (E) a catalytic amount of a hydrosilylation catalyst; wherein the sum of the average number of silicon-bonded alkenyl groups per molecule in component (A) and the average number of silicon-bonded hydrogen atoms per molecule in component (C) is greater than 4.

The present invention is also directed to a silicone pressure sensitive adhesive comprising a reaction product of the above-described composition.

The present invention is further directed to a multi-part silicone composition for preparing a silicone pressure sensitive adhesive, the composition comprising components (A) through (E) in two or more parts, provided neither component (A) nor component (B), when component (B) contains alkenyl groups, are present with components (C) and (E) in the same part.

The silicone composition of the present invention has numerous advantages, including adjustable thixotropy, low VOC (volatile organic compound) content, and rapid low temperature cure. Moreover, the present silicone composition cures to form a silicone pressure sensitive adhesive having good adhesion and tack.

The silicone composition of the present invention is useful for preparing a silicone pressure sensitive adhesive. The silicone PSA of the present invention has numerous uses, including adhesive tapes, bandages, and labels. The present silicone PSA is also useful for bonding a variety of materials, particularly electronic components to flexible or rigid substrates.

These and other features, aspects, and advantages of the present invention will become better understood with reference to the following description and appended claims.

DETAILED DESCRIPTION OF THE INVENTION

The silicone composition of the present invention is "thixotropic" or has "thixotropy", meaning that the composition exhibits a reduction in viscosity when a shearing action is applied and an increase in viscosity upon subsequent rest.

As used herein, the term "thixotropy index" is defined as the ratio of the viscosity of the silicone composition at a shear rate of 1 rad/s to the viscosity of the composition at a shear rate of 100 rad/s, wherein each viscosity is measured at 23±2° C.

Further, the silicone pressure sensitive adhesive of the present invention is not considered to be a "silicone rubber" or "silicone elastomer", which generally refer to a cured non-tacky silicone. The term "silicone pressure sensitive adhesive" refers to a cured silicone adhesive which in dry form is tacky and firmly adheres to a variety of dissimilar surfaces upon mere contact without the need for more than finger or hand pressure. Such an adhesive also can be removed from smooth surfaces without transferring more than trace quantities of the adhesive to the surface.

According to the present invention, a silicone composition for preparing a silicone pressure sensitive adhesive comprises:

(A) 20 to 55 parts by weight of a polydiorganosiloxane containing an average of at least two silicon-bonded alkenyl groups per molecule;

(B) 45 to 80 parts by weight of an organopolysiloxane resin comprising $R^3_3SiO_{1/2}$ units and $SiO_{4/2}$ units wherein each $R^3$ is independently selected from the group consisting of monovalent hydrocarbon and monovalent halogenated hydrocarbon groups, the mole ratio of $R^3_3SiO_{1/2}$ units to $SiO_{4/2}$ units is from 0.6:1 to 1.5:1, the resin contains less than about 2 mole percent of alkenyl groups, and the total amount of components (A) and (B) is 100 parts by weight;

(C) an organohydrogenpolysiloxane having an average of at least two silicon-bonded hydrogen atoms per molecule in an amount sufficient to cure the composition;

(D) a thixotropic agent in an amount sufficient to impart thixotropy to the composition, wherein the agent is selected from the group consisting of (1) at least one silica filler having an average surface area of from 50 to 400 m²/g; and (2) a mixture comprising (a) at least one silica filler having an average surface area of from 0.5 to 400 m²/g; and (b) an additive selected from the group consisting of (i) at least one organopolysiloxane containing an average of at least two silicon-bonded hydroxyl groups and from about 4 to about 40 silicon atoms per molecule, (ii) a reaction product of at least one organopolysiloxane containing an average of at least two silicon-bonded hydroxyl groups and from about 4 to about 40 silicon atoms per molecule, and at least one silane containing at least one silicon-bonded alkoxy group and at least one silicon-bonded epoxy-containing organic group per molecule, (iii) at least one polyether, (iv) at least one poly(vinyl alcohol), (v) at least one polysaccharide, (vi) at least one triester of glycerol, (vii) at least one hydrocarbon free of aliphatic unsaturation, and (viii) a mixture comprising at least two of the aforementioned additives, provided that when the additive is (vii), the composition contains an effective amount of at least one silica filler having a surface area of from 50 to 400 m²/g; and (E) a catalytic amount of a hydrosilylation catalyst; wherein the sum of the average number of silicon-bonded alkenyl groups per molecule in component (A) and the average number of silicon-bonded hydrogen atoms per molecule in component (C) is greater than 4.

Component (A) of the present invention is at least one polydiorganosiloxane containing an average of at least two silicon-bonded alkenyl groups per molecule. The structure of the polydiorganosiloxane is typically linear, however it may contain some branching due to the presence of trifunctional siloxane units. The alkenyl groups typically have from 2 to about 10 carbon atoms and are exemplified by, but not limited to, vinyl, allyl, butenyl, and hexenyl. The alkenyl groups in the polydiorganosiloxane may be located at terminal, pendant, or both terminal and pendant positions. The remaining silicon-bonded organic groups in the polydiorganosiloxane are independently selected from the group consisting of monovalent hydrocarbon and monovalent halogenated hydrocarbon groups free of aliphatic unsaturation. These monovalent groups typically have from 1 to about 20 carbon atoms, preferably from 1 to 10 carbon atoms, and are exemplified by, but not limited to alkyl such as methyl, ethyl, propyl, pentyl, octyl, undecyl, and octadecyl; cycloalkyl such as cylcohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Preferably, at least 50 percent, and more preferably at least 80%, of the organic groups free of aliphatic unsaturation in the polydiorganosiloxane are methyl.

The viscosity of the polydiorganosiloxane at 25° C., which varies with molecular weight and structure, is typically from 0.04 to about 50 Pa·s, preferably from 0.2 to 10 Pa·s, and more preferably from 1 to 5 Pa·s.

Preferably, the polydiorganosiloxane has the general formula $R^2R^1_2SiO(R^1_2SiO)_aSiR^1_2R^2$ wherein each $R^1$ is independently selected from the group consisting of monovalent hydrocarbon and monovalent halogenated hydrocarbon groups free of aliphatic unsaturation, as defined above; $R^2$ is alkenyl, as defined above; and subscript a has a value such that the viscosity of the polydiorganosiloxane at 25° C. is in one of the ranges cited above. Preferably, $R^1$ is methyl and $R^2$ is vinyl.

Examples of polydiorganosiloxanes useful in the present invention include, but are not limited to, the following: $ViMe_2SiO(Me_2SiO)_aSiMe_2Vi$, $ViMe_2SiO(Me_2SiO)_{0.25a}(MePhSiO)_{0.75a}SiMe_2Vi$, $ViMe_2SiO(Me_2SiO)_{0.95a}(Ph_2SiO)_{0.05a}SiMe_2Vi$, $ViMe_2SiO(Me_2SiO)_{0.98a}(MeViSiO)_{0.02a}SiMe_2Vi$, $Me_3SiO(Me_2SiO)_{0.95a}(MeViSiO)_{0.05a}SiMe_3$, and $PhMeViSiO(Me_2SiO)_aSiPhMeVi$, where Me, Vi, and Ph denote methyl, vinyl, and phenyl respectively and a is as defined above. Preferred polydiorganosiloxanes are vinyl-terminated polydimethylsiloxanes. A particularly preferred polydiorganosiloxane is a dimethylvinylsiloxy-terminated polydimethylsiloxane having a viscosity of from 0.3 to 0.6 Pa·s at 25° C.

Component (A) can be a single polydiorganosiloxane or a mixture comprising two or more polydiorganosiloxanes that differ in at least one of the following properties: structure, viscosity, average molecular weight, siloxane units, and sequence.

The concentration of component (A) in the silicone composition of the present invention is typically from 20 to 55 parts by weight and preferably from 30 to 45 parts by weight, per 100 parts by weight of components (A) and (B) combined.

Methods of preparing the polydiorganosiloxane of the present composition, such as hydrolysis and condensation of the corresponding organohalosilanes or equilibration of cyclic polydiorganosiloxanes, are well known in the art.

Component (B) of the present invention is at least one organopolysiloxane resin comprising $R^3{}_3SiO_{1/2}$ siloxane units and $SiO_{4/2}$ siloxane units wherein each $R^3$ is independently selected from the group consisting of monovalent hydrocarbon and monovalent halogenated hydrocarbon groups. Additionally, the organopolysiloxane resin may contain minor amounts of monoorganosiloxane and diorganosiloxane units. The monovalent groups represented by $R^3$ typically have from 1 to about 20 carbon atoms and preferably have from 1 to about 10 carbon atoms. Examples of monovalent groups include, but are not limited to, alkyl such as methyl, ethyl, propyl, pentyl, octyl, undecyl, and octadecyl; cycloalkyl such as cylcohexyl; alkenyl such as vinyl, allyl, butenyl, and hexenyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Preferably, at least one-third, and more preferably substantially all $R^3$ groups in the organopolysiloxane resin are methyl.

The mole ratio of $R^3{}_3SiO_{1/2}$ units (M units) to $SiO_{4/2}$ units (Q units) in the organopolysiloxane resin is typically from 0.6:1 to 1.5:1, and preferably from 0.65:1 to 0.95:1, as determined by $^{29}Si$ nuclear magnetic resonance ($^{29}Si$ NMR) spectrometry. The M/Q ratio represents the total number of M units to the total number of Q units in the organopolysiloxane resin and includes contributions from any neopentamer present, described below.

When the organopolysiloxane resin of the present invention is prepared by well known methods, such as the method of Daudt et al. described below, the resin generally contains silicon-bonded hydroxyl groups. The resin typically contains less than 5 percent by weight of silicon-bonded hydroxyl groups, based on the total weight of the resin, as determined by $^{29}Si$ NMR spectrometry.

The organopolysiloxane resin contains less than about 2 mole percent of alkenyl groups and preferably the resin is substantially free of alkenyl groups. The mole percent of alkenyl groups in the organopolysiloxane resin is defined here as the ratio of the number of moles of alkenyl groups in the resin to the total number of moles of siloxane units in the resin, multiplied by 100. When the alkenyl group content of the resin exceeds about 2 mole percent, the adhesive properties, tack and peel, of the silicone PSA tend to deteriorate.

A preferred component (B) is a mixture comprising about 85 percent by weight of a first organopolysiloxane resin consisting essentially of $(CH_3)_3SiO_{1/2}$ siloxane units and $SiO_{4/2}$ siloxane units, wherein the resin has a number-average molecular weight of about 4,600, the mole ratio of $(CH_3)_3SiO_{1/2}$ units to $SiO_{4/2}$ units is about 0.70:1, and the resin contains less than 1 percent by weight of hydroxyl groups; and about 15 percent by weight of a second organopolysiloxane resin consisting essentially of $(CH_3)_3SiO_{1/2}$ siloxane units and $SiO_{4/2}$ siloxane units, wherein the resin has a number-average molecular weight of about 4,600, the mole ratio of $(CH_3)_3SiO_{1/2}$ units to $SiO_{4/2}$ units is about 0.70:1, and the resin contains about 3.5 percent by weight of hydroxyl groups.

Component (B) can be a single organopolysiloxane resin or a mixture comprising two or more organopolysiloxane resins that differ in at least one of the following properties: monofunctional (M) siloxane units, M/Q ratio, average molecular weight, hydroxyl content, and alkenyl content. Component (B) can also contain a small amount of a low molecular weight material comprised substantially of a neopentamer organopolysiloxane having the formula $(R_3SiO)_4Si$, the latter material being a byproduct in the preparation of the resin according to the method of Daudt et al., described infra.

The concentration of component (B) in the composition of the present invention is typically from 45 to 80 parts by weight and preferably from 55 to 70 parts by weight, per 100 parts by weight of components (A) and (B) combined. When the concentration of component (B) is less than about 45 parts by weight, the tack of the silicone PSA tends to deteriorate. When the concentration of component (B) exceeds about 80 parts by weight, the silicone composition has a relatively high viscosity and the silicone PSA tends to be hard and brittle.

The organopolysiloxane resin of the present invention can be prepared by methods well-known in the art. Preferably, the resin is prepared by the silica hydrosol capping process of Daudt et al. disclosed in U.S. Pat. No. 2,676,182, which is hereby incorporated by reference to teach how to prepare organopolysiloxane resins which are useful in the present invention. This method involves reacting a silica hydrosol under acidic conditions with a hydrolyzable triorganosilane such as trimethylchlorosilane, a siloxane such as hexamethyldisiloxane, or mixtures thereof, and recovering a copolymer having M and Q units. The resulting copolymers generally contain from about 2 to about 5 percent by weight of hydroxyl groups.

The content of silicon-bonded hydroxyl groups in the organopolysiloxane resin can be reduced, preferably to less than 1 percent by weight, by reacting the resin with a suitable endblocking agent. A wide variety of endblocking agents, such as organosiloxanes, organochlorosilanes, and organodisilazanes, are known in the art. Such agents are exemplified in U.S. Pat. No. 4,584,355 to Blizzard et al.; U.S. Pat. No. 4,591,622 to Blizzard et al.; and U.S. Pat. No. 4,585,836 to Homan et al.; which are hereby incorporated by reference. A single endblocking agent or a mixture of such agents can be used to prepare the organopolysiloxane resin of the present invention.

Preferably, both component (A) and component (B) are devolatilized, as described below, to remove low molecular weight siloxanes and cyclosiloxanes, which are normally produced as byproducts in the preparation of these materials. A silicone composition containing a devolatilized polydiorganosiloxane and a devolatilized organopolysiloxane resin exhibits improved adhesion and less outgassing of low molecular weight silicone species compared with compositions containing unmodified polydiorganosiloxane and resin.

Component (C) of the present invention is at least one organohydrogenpolysiloxane having an average of at least two silicon-bonded hydrogen atoms per molecule and an average of no more than one silicon-bonded hydrogen atom per silicon atom. The silicon-bonded hydrogen atoms can be located at terminal, pendant, or at both terminal and pendant positions in the organohydrogenpolysiloxane. The organohydrogenpolysiloxane can be a homopolymer or a copolymer. The structure of the organohydrogenpolysiloxane can be linear, branched, or cyclic. Examples of siloxane units that may be present in the organohydrogenpolysiloxane include, but are not limited to, $HR^4{}_2SiO_{1/2}$, $R^4{}_3SiO_{1/2}$, $HR^4SiO_{2/2}$, $R^4{}_2SiO_{2/2}$, $R^4SiO_{3/2}$, and $SiO_{4/2}$ unit. In the preceding formulae each $R^4$ is independently selected from the group consisting of monovalent hydrocarbon and monovalent halogenated hydrocarbon groups free of aliphatic unsaturation, as defined and exemplified above for component (A). Preferably, at least 50 percent of the organic groups in the organohydrogenpolysiloxane are methyl.

A preferred organohydrogenpolysiloxane is a dimethylhydrogensiloxy-terminated copolymer having the formula $HMe_2SiO[Si(OSiMe_2H)(CH_2CH_2CF_3)O]_bSiMe_2H$, wherein b has an average value of from 1 to 3. Applicants have discovered that a silicone composition containing the aforementioned copolymer can be applied to a cured silicone surface and allowed to stand for several days without adversely affecting subsequent cure. However, silicone compositions containing conventional nonhalogenated organohydrogenpolysiloxanes exhibit poor cure after remaining in contact with a cured silicone surface for a relatively short period of time, for example, less than one day. Poor cure is believed due to migration of the organohydrogenpolysiloxane from the silicone composition into the cured silicone. Compared with the conventional nonhalogenated organohydrogenpolysiloxanes, the above copolymer tends not to migrate from the silicone composition into the cured silicone substrate.

Component (C) can be a single organohydrogenpolysiloxane or a mixture comprising two or more organohydrogenpolysiloxanes that differ in at least one of the following properties: structure, average molecular weight, viscosity, siloxane units, and sequence.

The concentration of component (C) in the silicone composition of the present invention is sufficient to cure the composition. The exact amount of component (C) depends on the desired extent of cure, which generally increases as the ratio of the number of moles of silicon-bonded hydrogen atoms in component (C) to the number of moles of alkenyl groups present in components (A) and (B) combined increases. Typically, the concentration of component (C) is sufficient to provide from 1 to 3 silicon-bonded hydrogen atoms per alkenyl group in components (A) and (B) combined. Preferably, the concentration of component (C) is sufficient to provide from 1.5 to 2 silicon-bonded hydrogen atoms per alkenyl group in components (A) and (B) combined.

Methods of preparing the organohydrogenpolysiloxane of the present invention, such as hydrolysis and condensation of the appropriate organohalosilanes, are well known in the art.

To ensure compatibility of components (A), (B), and (C), described supra, the predominant organic group in each component is preferably the same. Preferably this group is methyl.

Component (D)(1) of the present invention is a thixotropic agent consisting of at least one silica filler having an average surface area of from 50 to 400 $m^2/g$. Examples of suitable types of silica fillers include, but are not limited to, fumed silica, precipitated silica, and silica fillers prepared by treating the surfaces of the aforementioned silica with organosilicon compounds such as organochlorosilanes, organosiloxanes, organodisilazanes, and organoalkoxysilanes. Component (D)(1) can be a single silica filler having an average surface area of from 50 to 400 $m^2/g$ or a mixture comprising two or more such silica fillers that differ in at least one of the following properties: silica type, surface area, surface treatment, and particle shape.

A preferred silica filler is a treated fumed silica sold under the trademark CAB-O-SIL TS-720 by Cabot Corporation. The treated fumed silica is a high purity silica which has been treated with a dimethylsilicone fluid. The treated fumed silica typically has a surface area (BET) of $100\pm20$ $m^2/g$, a carbon content of $5.4\pm0.6$ percent by weight, and a specific gravity of 1.8 $g/cm^3$.

The concentration of component (D)(1) is sufficient to impart thixotropy to the silicone composition. Typically, the concentration of component (D)(1) is such that the composition has a thixotropy index of at least about 1.5. The exact concentration of component (D)(1) depends on the desired thixotropy, the surface area of the silica filler, the shape of the silica filler particles, the surface treatment of the silica filler, and the nature of the other components in the silicone composition. Typically, the concentration of component (D)(1) is from about 2 to about 15 parts by weight per 100 parts by weight of components (A) and (B) combined. When the concentration of component (D)(1) is less than about 2 parts by weight, the composition does not exhibit a significant degree of thixotropy. When the concentration of component (D)(1) exceeds about 15 parts by weight, the composition has relatively high viscosity and poor processability.

Methods of preparing silica fillers suitable for use in the silicone composition of the present invention are well known in the art; many of these silica fillers are commercially available. As stated above, the silica filler of the present invention can be an untreated silica or a filler prepared by treating a silica with an organosilicon compound. In the latter case, the silica can be treated prior to admixture with the other ingredients of the silicone composition or the silica can be treated in situ during the preparation of the silicone composition. Methods for treating silicas with organosilanes, organodisilazanes, and organosiloxanes are well known in the art and exemplified in U.S. Pat. No. 3,122,516 to Polmanteer; U.S. Pat. No. 3,334,062 to Brown and Hyde; U.S. Pat. No. 3,635,743 to Smith; and U.S. Pat. No. 3,624,023 to Hartage. These patents are hereby incorporated by reference to teach agents and methods useful for preparing the treated silica filler of component (D)(1).

Component (D)(2) is a thixotropic agent consisting of a mixture comprising components (a) and (b), described hereinbelow. Component (D)(2)(a) is at least one silica filler having an average surface area of from 0.5 to 400 $m^2/g$. Examples of suitable types of silica fillers include, but are not limited to, natural silicas such as crystalline quartz, ground quartz, and diatomaceous silica; synthetic silicas such as fumed silica, fused silica (fused quartz), silica gel, and precipitated silica; and fillers prepared by treating the surfaces of the aforementioned silicas with organosilicon compounds such as organochlorosilanes, organosiloxanes, organodisilazanes, and organoalkoxysilanes. Component (D)(2)(a) can be a single silica filler having an average surface area of from 0.5 to 400 $m^2/g$ or a mixture comprising two or more such silica fillers that differ in at least one of the following properties: silica type, surface area, surface treatment, and particle shape. Suitable methods of treating a silica with an organosilicon compound are described above for component (D)(1).

Component (D)(2)(b) is an additive selected from the group consisting of (i) through (viii), described below.

Component (D)(2)(b)(i) is at least one organopolysiloxane containing an average of at least two silicon-bonded hydroxyl groups per molecule and having from about 4 to about 40 silicon atoms per molecule. The organopolysiloxane can have a linear, branched, or cyclic structure. The silicon-bonded organic groups in the organopolysiloxane are independently selected from the group consisting of monovalent hydrocarbon and monovalent halogenated hydrocarbon groups, as defined and exemplified above for component (B). A preferred alkyl group is methyl and a preferred alkenyl group is vinyl. The silicon-bonded hydroxyl groups in the organopolysiloxane can be located at terminal, pendant, or at both terminal and pendant positions. Examples of siloxane units that may be present in the organopolysiloxane include, but are not limited to, $CH_2=CHSiO_{3/2}$, $C_6H_5SiO_{3/2}$, $HOSiO_{3/2}$, $R^5(CH_2=CH)SiO_{2/2}$, $R^5(HO)SiO_{2/2}$, $R^5(C_6H_5)SiO_{2/2}$, $(C_6H_5)_2SiO_{2/2}$, $(C_6H_5)(CH_2=CH)SiO_{2/2}$, $(C_6H_5)(HO)SiO_{2/2}$, $(CH_2=CH)(HO)SiO_{2/2}$, $(HO)R^5_2SiO_{1/2}$, $(CH_2=CH)R^5_2SiO_{1/2}$, $(HO)(CH_2=CH)R^5SiO_{1/2}$, and $(HO)(C_6H_5)R^5SiO_{1/2}$, wherein each $R^5$ is independently selected from the group consisting of monovalent hydrocarbon and monovalent halogenated hydrocarbon groups, as defined and exemplified above for $R^3$ in component (B).

Preferably, the organopolysiloxane is a hydroxyl-terminated polydiorganosiloxane having the general formula $HOR^5_2SiO(R^5_2SiO)_cSiR^5_2OH$, wherein $R^5$ as above and c is from about 2 to about 38.

Component (D)(2)(b)(i) can be a single organopolysiloxane or a mixture comprising two or more different organopolysiloxanes.

Methods of preparing organopolysiloxanes, such as hydrolysis and condensation of the corresponding organohalosilanes or equilibration of cyclic polydiorganosiloxanes, are well known in the art.

Component (D)(2)(b)(ii) is a reaction product of at least one organopolysiloxane containing an average of at least two silicon-bonded hydroxyl groups and from about 4 to about 40 silicon atoms per molecule, and at least one silane containing at least one silicon-bonded alkoxy group and at least one silicon-bonded epoxy-containing organic group per molecule. The organopolysiloxane is identical to the organopolysiloxane described above for component D(2)(b)(i).

The silane can have a linear, branched, or cyclic structure. The alkoxy groups in the silane typically have less than 5 carbon atoms and are exemplified by methoxy, ethoxy, propoxy, and butoxy. Methoxy is a preferred alkoxy group. Preferably, the epoxy-containing organic group has a formula selected from the group consisting of:

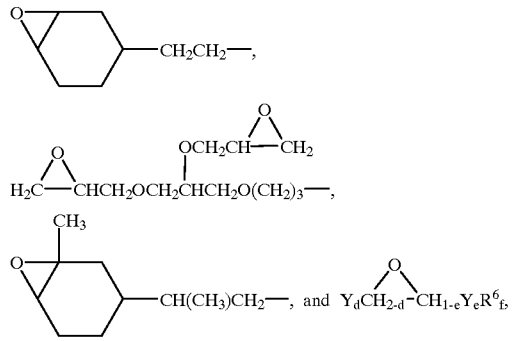

wherein each Y is independently an alkyl group having 1 or 2 carbon atoms; d is 0, 1, or 2; e and f are each 0 or 1; and $R^6$ is a divalent hydrocarbon group having no more than about 12 carbon atoms. Preferably, $R^6$ is selected from the group consisting of a saturated aliphatic hydrocarbon group, an arylene group, and a divalent group having the formula

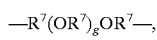

wherein $R^7$ is a divalent saturated aliphatic hydrocarbon group having from 2 to 6 carbon atoms and g has a value of from 0 to 8.

The remaining silicon-bonded groups in the silane are typically organic groups independently selected from the group consisting of monovalent hydrocarbon groups having less than about 7 carbon atoms and monovalent fluorinated alkyl groups having less than about 7 carbon atoms. Examples of monovalent hydrocarbon groups include, but not limited to, alkyl, such as methyl, ethyl, propyl, hexyl; alkenyl, such as vinyl; and aryl, such as phenyl. Examples of monovalent fluorinated alkyl groups include, but are not limited to, 3,3,3-trifluoropropyl, β-(perfluoroethyl)ethyl, and β-(perfluoropropyl)ethyl. Preferably, the silane is a mono(epoxyorgano)trialkoxysilane, such as glycidoxypropyltrimethoxysilane. Methods for the preparation of epoxy-containing alkoxysilanes are well known in the art.

The organopolysiloxane and the silane can be reacted using well known methods of reacting silanol-containing organosiloxanes with alkoxysilanes. The reaction is typically carried out in the presence of a basic catalyst. Examples of suitable catalysts include, but are not limited to, alkali metal hydroxides, alkali metal alkoxides, and alkali metal silanoates. Preferably, the reaction is carried out using about one mole of the silane per silicon-bonded hydroxyl group in the organopolysiloxane. The organopolysiloxane and silane can be reacted either in the absence of a diluent or in the presence of an inert organic solvent, such as toluene. The reaction is preferably carried out at an elevated temperature, for example, from about 80 to about 150° C.

A preferred reaction product is prepared by reacting a hydroxyl-terminated dimethyl methylvinylsiloxane having an average of two dimethylsiloxane units and two methylvinylsiloxane units per molecule, and glycidoxypropyltrimethoxysilane at a temperature of about 140° C. for 2 hours in the presence of a potassium catalyst.

Component (D)(2)(b)(iii) is at least one polyether. Component (D)(2)(b)(iii) can be any polyether that, when combined with component (D)(2)(a), imparts thixotropy to the silicone composition. The polyether can be a compound, oligomer, homopolymer, or copolymer. Further, the structure of the polyether can be linear, branched, or cyclic. Preferably, the polyether contains oxyalkylene units.

Polyethers containing oxyalkylene units include, but are not limited to, a poly(oxyethylene) having the general formula $XO(CH_2CH_2O)_hX$, a poly(oxypropylene) having the general formula $XO[CH_2CH(CH_3)O]_hX$, a poly(oxybutylene) having the general formula $XO(CH_2CH_2CH_2CH_2O)_hX$, and a poly(oxyethyleneoxypropylene) copolymer having the formula $XO(CH_2CH_2O)_i[CH_2CH(CH_3)O]_jX$, wherein each X is independently hydrogen, $R^8$, or $-C(=O)-R^8$, wherein $R^8$ is a monovalent hydrocarbon or monovalent halogenated hydrocarbon group as defined and exemplified above for $R^3$ in component (B), and h has a value such that the average molecular weight of the poly(oxyalkylene) is from about 100 to about 10,000, and i+j=h; cyclic poly(oxyalkylene)s; and polydiorganosiloxane-polyoxyalkylene copolymers.

Specific examples of polyethers containing oxyalkylene units include, but are not limited to, poly(ethylene glycol), poly(propylene glycol), poly(tetrahydrofuran), and ether and ester derivatives thereof, such as monomethyl ether, dimethyl ether, and diacetate; dibenzylidene sorbitol, a cyclic polyether sold under the trade mark MILLITHIX 925 by Millikin Chemical Company; the series of poly(oxyethylene) sorbitan esters under the trademark Tween sold by I.C.I. America; and the series of nonylphenyl poly (ethylene glycol) ethers sold under the trade mark TERGITOL NP by Union Carbide.

A preferred polydiorganosiloxane-polyoxyalkylene copolymer has a general formula selected from the group consisting of:

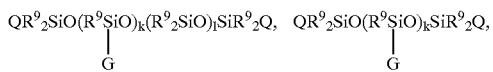

and

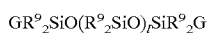

wherein each $R^9$ is a monovalent hydrocarbon group, G is a polyoxyalkylene group having a general formula selected from the group consisting of:

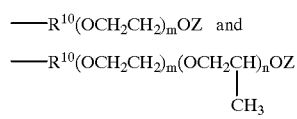

wherein $R^{10}$ is a divalent hydrocarbon group having from 2 to 20 carbon atoms; Q is $R^9$ or G; Z is selected from the group consisting of hydrogen, alkyl groups having 1 to 4 carbon atoms and acyl groups having from 2 to 6 carbon atoms; and k, l, m, and n are independently selected from positive integers. Preferably, $R^9$ has from 1 to 12 carbon atoms, $R^{10}$ has from 3 to 6 carbon atoms, k and l are independently from 1 to 100, and m and n are independently from 1 to 20.

Examples of monovalent hydrocarbon groups represented by $R^9$ include, but are not limited to, alkyl, such as methyl, ethyl, propyl, butyl, and octyl; cycloalkyl, such as cyclopentyl and cylohexyl; and aryl such as phenyl, naphthyl, benzyl, and tolyl. Most preferably, the monovalent hydrocarbon groups represented by $R^9$ are all methyl, based on the availability of starting materials.

Methods of preparing polydiorganosiloxane-polyoxyalkylene copolymers are well known in the art. For example, a polydiorganosiloxane-polyoxyalkylene copolymer can be prepared using a hydrosilylation reaction by reacting, for example, a polydiorganosiloxane containing silicon-bonded hydrogen atoms with a polyoxyalkylene containing groups having aliphatic unsaturation in the presence of a platinum group catalyst.

Alternatively, a polydiorganosiloxane-polyoxyalkylene copolymer can be prepared using a nucleophilic displacement reaction by reacting, for example, a polydiorganosiloxane containing silicon-bonded haloalkyl groups, such as —$CH_2Cl$, with a polyoxyalkylene containing hydroxyl groups in the presence of a hydrogen halide scavenger.

A polydiorganosiloxane-polyoxyalkylene copolymer can also be prepared using a condensation reaction by reacting, for example, a polydiorganosiloxane containing silicon-bonded hydrolyzable groups with a polyoxyalkylene containing hydroxyl groups. Examples of hydrolyzable groups include, but are not limited to, hydrogen; hydroxy; alkoxy, such as methoxy, ethoxy, and isopropoxy; halo, such as fluoro, chloro, bromo, and iodo; amido, such as N-methylacetamido; oximo, such as methylethylketoximo; aminoxy, such as diethylaminoxy; and acyloxy, such as acetoxy and propionoxy.

The aforementioned methods of preparing polydiorganosiloxane-polyoxyalkylene copolymers, as well as other methods, are described in U.S. Pat. No. 4,122,029, which is hereby incorporated by reference to teach methods of preparing polydiorganosiloxanepolyoxyalkylene copolymers.

Component (D)(2)(b)(iv) is at least one poly(vinyl alcohol). Examples of poly(vinyl alcohol)s include, but are not limited to, a poly(vinyl alcohol) having the general formula [—$CH_2CH(OH)$—]$_o$ and a poly(vinyl alcohol-vinyl acetate) copolymer having the general formula [—$CH_2CH(OH)$—]$_p$[$CH_2CH(O_2CCH_3)$—]$_q$, wherein o has a value such that the average molecular weight of the polymer is from about 10,000 to about 100,000, p+q=o, and the ratio of p to q is from about 4:1 to about 9:1. Component (D)(2)(b)(iv) can be a single poly(vinyl alcohol) or a mixture comprising two or more different poly(vinyl alcohol)s.

Component (D)(2)(b)(v) at least one polysaccharide. Examples of polysaccharides include, but are not limited to, cellulose; cellulose esters, such as cellulose acetates; cellulose ethers such as methyl, ethyl, and benzyl ethers of cellulose; xanthum gum, pectins, guar gum, and karaya gum. The cellulose and cellulose derivatives can have a powdered or microcrystalline form. Component (D)(2)(b)(v) can be a single polysaccharide or a mixture comprising two or more different polysaccharides. Component (D)(2)(b)(vi) is at least one triester of glycerol. Examples of triesters of glycerol include, but are not limited to, naturally occurring oils, such as linseed, dehydrated castor, soybean, coconut, corn, cottonseed, olive, palm, peanut, and sunflower; fats and oils prepared by hydrogenating the aforementioned oils; and synthetic triesters of glycerol containing unsaturated and/or saturated fatty acid components having from about 3 to about 18 carbon atoms. Component (D)(2)(b)(vi) can be a single triester of glycerol or a mixture comprising two or more different triesters.

Component (D)(2)(b)(vii) is at least one hydrocarbon free of aliphatic unsaturation. The hydrocarbon typically has from about 7 to about 30 carbon atoms and preferably has about 10 to about 20 carbon atoms. The structure of the hydrocarbon can be linear, branched, or cyclic. Examples of hydrocarbons free of aliphatic unsaturation include, but are not limited to, saturated hydrocarbons, such as heptane, octane, nonane, decane, undecane, dodecane, tridecane, tetradecane, pentadecane, hexadecane, heptadecane, octadecane, nonadecane, icosane, henicosane, docosane, triconsane, tetracosane, pentacosane, hexacosane, heptacosane, octacosane, nonacosane, triacontane, and isomers of the preceding hydrocarbons; and aromatic hydrocarbons. Preferably, the hydrocarbon has a normal boiling point such that the hydrocarbon does not readily evaporate during application of the silicone composition. The hydrocarbon solvent preferably has a boiling point of from about 180 to about 300° C. Component (D)(2)(b)(vii) can be a single hydrocarbon or a mixture comprising two or more different hydrocarbons that differ in the number or arrangement of carbon atoms.

A preferred hydrocarbon is a mixture of C-13 to C-15 saturated hydrocarbons, including 41 percent by weight of 1,4-bis(1-methylethyl)-2-methylcylcohexane, which is sold under the trademark EXXSOL D110 by Exxon Corporation. The hydrocarbon mixture has a flash point of 114.4° C., a boiling range of 251 to 269° C., and a viscosity of 0.0028 Pa·s at 25° C.

Component (D)(2)(b) can be a single additive as defined above or a mixture comprising two or more of the additives. With the exception of components (D)(2)(b)(i) and (D)(2)(b)(vii), component (D)(2)(b) is generally insoluble or only slightly soluble in the silicone composition.

A preferred component (D)(2) according to the present invention, is a mixture comprising fumed silica having a surface area of about 100 m²/g and a blend of C-13 to C-15 saturated hydrocarbons.

The concentration of component (D)(2), which consists of a mixture comprising components (D)(2)(a) and (D)(2)(b), is sufficient to impart thixotropy to the silicone composition. Typically, the combined concentrations of components (D) (2)(a) and (D)(2)(b) are such that the composition has a thixotropy index of at least about 1.5. The concentration of component (D)(2)(a) is typically from about 2 to about 60 parts by weight per 100 parts by weight of components (A) and (B) combined. However, it will be understood that as the average surface area of the silica filler increases within the range from 0.5 to 400 m²/g, it will be necessary to reduce the concentration of the silica filler within the above-stated range to obtain a processable composition. For example, the concentration of a silica filler having a surface area of from 0.5 to less than 25 m²/g is preferably from 30 to 60 parts by weight, the concentration of a silica filler having a surface area of from 50 to 150 m²/g is preferably from 10 to 20 parts by weight, and the concentration of a silica filler having a surface area of from 200 to 400 m²/g is preferably from 4 to 10 parts by weight.

Also, when component (D)(2)(b) is a single additive consisting of at least one hydrocarbon free of aliphatic unsaturation, component (D)(2)(a) contains an effective amount of at least one silica filler having an average surface area of from 50 to 400 m²/g. The exact amount of the silica filler depends on the desired thixotropy, the surface area of the silica filler, the surface treatment of the silica filler, the shape of the silica filler particles, and the nature of the other components in the silicone composition. Typically, the concentration of the silica filler is from about 2 to about 15 parts by weight per 100 parts by weight of components (A) and (B) combined. However, to obtain a processable composition, it may be necessary to reduce the amount of the silica filler having a surface area of from 50 to 400 m²/g within the above-stated range when component (D)(2)(a) also contains a silica filler having a surface area of less than 50 m²/g.

The concentration of component (D)(2)(b) is typically from about 0.1 to about 8 parts by weight and preferably is from about 0.1 to about 3 parts by weight, per 100 parts by weight of components (A) and (B) combined.

Component (E) of the present invention is a hydrosilylation catalyst that promotes the addition reaction of components (A) and (B), when component (B) contains alkenyl groups, with component (C). The hydrosilylation catalyst can be any of the well known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions.

Preferred hydrosilylation catalysts include the complexes of chloroplatinic acid and certain vinyl-containing organosiloxanes disclosed by Willing in U.S. Pat. No. 3,419,593, which is hereby incorporated by reference. A preferred catalyst of this type is the reaction product of chloroplatinic acid and 1,3-diethenyl-1,1,3,3-tetramethyldisiloxane.

A particularly preferred hydrosilylation catalyst is a microencapsulated hydrosilylation catalyst comprising a platinum group metal-containing catalyst encapsulated in a thermoplastic resin. Compositions containing microencapsulated hydrosilylation catalysts are stable for extended periods of time, typically several months or longer, under ambient conditions, yet cure relatively rapidly at temperatures above the melting or softening point of the thermoplastic resin(s).

The thermoplastic resin can be any resin that is insoluble in and impervious to the platinum group metal-containing catalyst, and also is insoluble in the silicone composition. The thermoplastic resin typically has a softening point of from about 40 to about 250° C.

As used hereinabove, the terms "insoluble" and "impervious" means that the amount of the thermoplastic resin that dissolves in the catalyst and/or silicone composition and the amount of catalyst that diffuses through the thermoplastic resin encapsulant during storage are insufficient to cause curing of the composition.

Examples of suitable thermoplastic resins include, but are not limited to, vinyl polymers, such as polyethylene, polystyrene, polyvinyl chloride, polyvinylidene chloride, and copolymers of vinyl chloride and vinylidene chloride; polyacrylates, such as polymethacrylate; cellulose derivatives, such as cellulose ethers, esters, and ether-ester; polyamides; polyesters; silicone resins, and polysilanes. Silicone resins are preferred thermoplastic resins according to the present invention.

Preferred catalysts are platinum catalysts, such as chloroplatinic acid, alcoholmodified chloroplatinic acid, platinum/olefin complexes, platinum/ketone complexes, and platinum/vinylsiloxane complexes.

The average particle size of the microencapsulated catalyst is typically from about 1 to about 500 μm and preferably is from about 1 to about 100 μm. The microencapsulated catalyst typically contains at least 0.01 percent by weight of the platinum group metal-containing catalyst.

A preferred microencapsulated hydrosilylation catalyst contains a platinum complex of 1,3-diethenyl-1,1,3,3-tetramethyldisiloxane encapsulated in a silicone resin consisting of 78 mole percent monophenylsiloxane units and 22 mole percent dimethylsiloxane units, wherein the silicone resin has a glass transition temperature of 60° C.; and a softening temperature of 90° C. The microencapsulated catalyst has an average particle size of 1.8 μm and a platinum content of 0.4 percent by weight.

The microencapsulated hydrosilylation catalysts can be prepared by any method known in the art for encapsulating a platinum group metal-containing catalyst in a thermoplastic resin. Examples of such methods include, but are not limited to, chemical methods such as interfacial polymerization and in situ polymerization; physico-chemical methods, such as coacervation and emulsion/suspension hardening; and physical-mechanical methods, such as spray drying.

Microencapsulated hydrosilylation catalysts and methods of preparing them are further described in U.S. Pat. No. 4,766,176 and the references cited therein; and U.S. Pat. No. 5,017,654. The relevant portions of these patents are hereby incorporated by reference to teach microencapsulated catalysts and methods of preparing microencapsulated catalysts suitable for use in the present invention.

The concentration of component (E) is sufficient to catalyze the addition reaction of components (A) and (B), when component (B) contains alkenyl groups, with component (C). Typically, the concentration of component (E) is sufficient to provide from 0.1 to 1000, preferably from 1 to 500, and more preferably from 5 to 50 parts per million of a platinum group metal, based on the combined weight of components (A), (B), and (C). The rate of cure is very slow below 0.1 ppm of platinum group metal. The use of more than 1000 ppm of platinum group metal results in no appreciable increase in cure rate, and is therefore uneconomical.

Mixtures of the aforementioned components (A), (B), (C), (D), and (E) may begin to cure at ambient temperature. To obtain a longer working time or "pot life", the activity of the catalyst under ambient conditions can be retarded or suppressed by the addition of a suitable inhibitor to the silicone composition of the present invention. A platinum catalyst inhibitor retards curing of the present silicone composition at ambient temperature, but does not prevent the composition from curing at elevated temperatures. Suitable platinum catalyst inhibitors include various "ene-yne" systems such as 3-methyl-3-penten-1-yne and 3,5-dimethyl-3-hexen-1-yne; acetylenic alcohols such as 3,5-dimethyl-1-hexyn-3-ol, 1-ethynyl-1-cyclohexanol, and 2-phenyl-3-butyn-2-ol; maleates and fumarates, such as the well known dialkyl, dialkenyl, and dialkoxyalkyl fumarates and maleates; and cyclovinylsiloxanes.

Acetylenic alcohols constitute a preferred class of inhibitors in the silicone composition of the present invention. In particular, 2-phenyl-3-butyn-2-ol is a preferred inhibitor according to the present invention. Compositions containing these inhibitors generally require heating at 70° C. or above to cure at a practical rate.

The concentration of platinum catalyst inhibitor in the present silicone composition is sufficient to retard curing of the composition at ambient temperature without preventing or excessively prolonging cure at elevated temperatures. This concentration will vary widely depending on the particular inhibitor used, the nature and concentration of the hydrosilylation catalyst, and the nature of the organohydrogenpolysiloxane.

Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. The optimum concentration for a particular inhibitor in a given silicone composition can be readily determined by routine experimentation.

The silicone composition of the present invention wherein the thixotropic agent is component (D)(1), at least one silica filler having an average surface area of from 50 to 400 $m^2/g$, can further comprise a silica filler having an average surface area less than about 25 $m^2/g$. A silicone composition comprising the latter filler cures to form a silicone PSA having a low coefficient of thermal expansion. Examples of suitable types of fillers include, but are not limited to, natural silicas such as crystalline quartz, ground quartz, and diatomaceous silica; synthetic silicas such as fused silica (fused quartz), silica gel, and precipitated silica; and fillers prepared by treating the surfaces of the aforementioned silicas with organosilicon compounds such as organochlorosilanes, organosiloxanes, organodisilazanes, and organoalkoxysilanes. The concentration of the silica filler having a surface area less than about 25 $m^2/g$ is typically from about 30 to about 60 parts by weight per 100 parts by weight of components (A) and (B) combined.

In general, the silicone composition of the present invention can further comprise small amounts of additional ingredients such as antioxidants, pigments, and stabilizers, provided the ingredient does not adversely affect the physical properties of the silicone composition, particularly thixotropy, or the silicone PSA, particularly tack and adhesion. Preferred pigments are carbon black and titanium dioxide.

The silicone composition of the present invention can be a one-part composition comprising components (A) through (E) in a single part or, alternatively, a multi-part composition comprising components (A) through (E) in two or more parts, provided neither component (A) nor component (B), when component (B) contains alkenyl groups, are present with components (C) and (E) in the same part. For example, a multi-part silicone composition for preparing a silicone pressure sensitive adhesive can comprise a first part containing a portion of component (A), a portion of component (B), a portion of component (D), and all of component (E) and a second part containing the remaining portions of components (A), (B), and (D) and all of component (C).

The silicone composition of the instant invention is typically prepared by combining components (A) through (E) and any optional ingredients in the stated proportions at ambient temperature with or without the aid of an organic solvent, which is described above. Although the order of addition of the various components is not critical if the silicone composition is to be used immediately, the hydrosilylation catalyst is preferably added last at a temperature below about 30° C. to prevent premature curing of the composition. Also, the multi-part silicone composition of the present invention can be prepared by combining the particular components in each part. Mixing can be accomplished by any of the techniques known in the art such as milling, blending, and stirring, either in a batch or continuous process. The particular device is determined by the viscosity of the components and the viscosity of the final silicone composition.

Preferably, component (A) and component (B) are devolatilized prior to mixing with the remaining components of the present silicone composition. The term "devolatilized" means that the components are subjected to evaporation under conditions that effect substantial removal of low molecular weight siloxanes and cyclosiloxanes, which are normally formed as byproducts during the preparation of components (A) and (B). Component (A), component (B), or a blend thereof, preferably in an organic solvent, can be devolatilized using methods typically employed to remove solvents from polymer compositions, such as wiped-film evaporation, rotary evaporation, and falling film evaporation. The specific conditions, such as temperature and pressure, required to produce a devolatilized composition will depend on the particular method of evaporation and can be determined by routine experimentation. In a preferred method, a blend of the polydiorganosiloxane and organopolysiloxane resin in xylene is devolatilized by passing it through a wiped-film still according to the procedure described in the Examples section below.

The silicone composition of the present invention should be stored in a sealed container to prevent exposure to air and moisture. The one part silicone composition of the present invention may be stored at room temperature for several weeks without any change in the properties of the cured silicone PSA product. However, the shelf life of the one part silicone composition of this invention can be extended to several months by storing the mixtures at a temperature below 0° C., preferably from –30 to –20° C. Individual sealed packages of the multi-part silicone composition described above can be stored for over 6 months at ambient conditions without any deterioration in the performance of the composition produced upon their admixture.

The silicone composition of the present invention can be applied to a substrate by any suitable means such as roll-coating, knife coating, blade coating, knife-over-roll coating, gravure coating, dipping, brushing, or spraying. Additionally, the present silicone position can be applied to a substrate by the method of stencil printing.

The silicone composition of the present invention can be applied to any known solid material. Suitable substrates include, but are not limited to, metals such as aluminum, silver, copper, and iron, and their alloys; silicon; porous materials such as paper, wood, leather, and fabrics; polyolefins, such as polyethylene and polypropylene; fluorocarbon polymers such as polytetrafluoroethylene and polyvinylfluoride; polystyrene; polyamides such as Nylon; polyimides; polyesters and acrylic polymers; painted surfaces; ceramics; glass; and glass cloth.

A silicone PSA according to the present invention comprises a reaction product of the silicone composition containing components (A) through (E), described above. The silicone composition of this invention can be cured at room temperature or by heating at temperatures up to 200° C., preferably from 70 to 200° C., and more preferably from 125 to 175° C., for a suitable length of time. For example, the present silicone composition cures in less than about one hour at 150° C.

The silicone composition of the present invention has numerous advantages, including adjustable thixotropy, low VOC (volatile organic compound) content, and rapid low temperature cure. Moreover, the present silicone composition cures to form a silicone pressure sensitive adhesive having good adhesion and tack.

The thixotropy of the present silicone composition can be conveniently adjusted by proper selection of the type and amount of thixotropic agent. Due to its thixotropy, the silicone composition can be applied to a variety of substrates using standard equipment, with minimal occurrence of stringing between the coating device and deposit. In particular, the silicone composition of the present invention can be applied using the method of stencil printing. Moreover, once applied, the silicone composition exhibits excellent dimensional stability, tending not to sag or flow.

Also, the silicone composition of the present invention, which does not require an organic solvent for many applications, has a very low VOC content. Consequently, the present silicone composition avoids the health, safety, and environmental hazards associated with solvent-borne silicone compositions. In addition, the solventless composition of the present invention typically undergoes less shrinkage during curing than solvent-borne silicone compositions.

Additionally, the silicone composition of the present invention cures rapidly at room temperature or moderately elevated temperatures without either an exotherm or the formation of byproducts. In fact, the cure rate of the silicone composition can be conveniently adjusted by regulating the concentration of catalyst and/or optional inhibitor.

Furthermore, the silicone composition of the present invention cures to form a silicone pressure sensitive adhesive having good adhesion and tack. The silicone PSA adheres to a wide variety of materials, including metals, glass, silicon, silicon dioxide, ceramics, natural rubber, silicone rubber, polyesters, polyolefins, and polyimides.

The silicone composition of the present invention is useful for preparing a silicone pressure sensitive adhesive. The silicone PSA of the present invention has numerous uses, including adhesive tapes, bandages, and labels. The present silicone PSA is particularly useful for bonding a variety of materials, particularly electronic components to flexible or rigid substrates.

EXAMPLES

The following examples are presented to further illustrate the silicone composition of this invention, but are not to be considered as limiting the invention, which is delineated in the appended claims. All parts and percentages reported in the examples are by weight. The following methods and materials were employed in the Examples:

The thixotropy index of a silicone composition was determined using a Rheometrics RDAII parallel plate rheometer. The instrument was operated in a dynamic shear mode with 2% strain at 23±2° C. Shear frequency was increased from 0.1 rad/s to 100 rad/s. The reported thixotropy index is the ratio of the viscosity of the silicone composition at a shear rate of 1 rad/s to the viscosity of the composition at a shear rate of 100 rad/s.

Peel adhesion of a silicone PSA was measured using a Monsanto T-2 Tensile Tester with a 100 g load cell and a Corning PC-35 hot plate held at 25±2° C. The test specimen was prepared by curing a 0.13-mm thick adhesive layer between two sheets of DuPont Kapton Type HN polyimide. The material was cured at 150° C. in a forced air oven for 1 hour. A test specimen measuring 2.54 cm×30.5 cm was cut from the laminate. The maximum force required to pull the sheets of polyimide away from the adhesive at an angle of 180° and a separation rate of 50 mm/min was determined during each 2.4 cm interval. The reported value for peel, expressed in units of kg/m, represents the average of five readings taken during the course of one pull.

Tensile adhesion of a silicone PSA was determined using a Stable Microsystems TA-XT2 Texture Analyzer with a 10 pound load cell. Samples were mounted on a Corning PC-35 hot plate held at 25° C. or 180° C. The test specimen was prepared by first casting the silicone composition on a fluorosilicone release liner to a thickness of about 0.13 mm. The material was cured at 150° C. in a forced air oven for 1 hour. The hot plate was preheated to the desired temperature for testing and held to maintain the temperature with a tolerance of ±2° C. The release liner was removed from the PSA and a square sample with the approximate dimensions of 13 mm by 13 mm was secured in the test apparatus and held in intimate contact with the hot plate. A 39.6-mm² silicon die was immediately brought into contact with the surface of the adhesive at a rate of 2 mm/s, a contact pressure of 2 g-force, and a dwell time of 60 seconds. The die was then withdrawn at a rate of 1 mm/s and the maximum force required to separate the probe from the adhesive was determined. The reported value for tensile adhesion, expressed in units of grams, represents the average of three measurements performed on different regions of the same sample.

Resin/Polymer Blend A: a devolatilized resin/polymer blend prepared by passing the following mixture through a wiped-film still having a feed rate of 15 cm³/min, a temperature of 210° C., a pressure of 67 to 95 Pa, and a blade speed of 70 rpm: 53.13 percent by weight of an organopolysiloxane resin consisting essentially of $(CH_3)_3SiO_{1/2}$ siloxane units and $SiO_{4/2}$ siloxane units, wherein the resin has a number-average molecular weight of about 2,600, the mole ratio of $(CH_3)_3SiO_{1/2}$ units to $SiO_{4/2}$ units is about 0.9:1, and the resin contains less than 1 percent by weight of silicon-bonded hydroxyl groups; 21.87 percent by weight of a dimethylvinylsiloxy-terminated polydimethylsiloxane having a viscosity of about 0.3 to 0.6 Pa·s at 25° C., and 25 percent by weight of xylene. The devolatilized resin/polymer blend contained 67.52 percent by weight resin and 32.48 percent by weight polymer.

Resin/Polymer Blend B: a devolatilized resin/polymer blend prepared by passing the following mixture through a wiped-film still having a feed rate of 15 cm³/min, a temperature of 210° C., a pressure of 67 to 95 Pa, and a blade speed of 70 rpm: 37.29 percent by weight of a first organopolysiloxane resin consisting essentially of $(CH_3)_3SiO_{1/2}$ siloxane units and $SiO_{4/2}$ siloxane units, wherein the resin has a number-average molecular weight of about 4,600, the mole ratio of $(CH_3)_3SiO_{1/2}$ units to $SiO_{4/2}$ units is about 0.70:1, and the resin contains less than 1 percent by weight of silicon-bonded hydroxyl groups; 6.78 percent by weight of a second organopolysiloxane resin consisting essentially of $(CH_3)_3SiO_{1/2}$ siloxane units and $SiO_{4/2}$ siloxane units, wherein the resin has a number-average molecular weight of about 4,600, the mole ratio of $(CH_3)_3SiO_{1/2}$ units to $SiO_{4/2}$ units is about 0.70:1; and the resin contains about 3.5 percent by weight of silicon-bonded hydroxyl groups; 30.51 percent by weight of a dimethylvinylsiloxy-terminated polydimethylsiloxane having a viscosity of about 45 to 65 Pa·s at 25° C., and 25.42 percent by weight of xylene. The devolatilized resin/polymer blend contained 50.00 percent by weight of the first resin, 9.09 percent by weight of the second resin, and 40.91 percent by weight of the polymer.

Organohydrogenpolysiloxane A: a trimethylsiloxy-terminated methylhydrogen dimethylsiloxane having an average of five methylhydrogensiloxane units and three dimethylsiloxane units per molecule and having a silicon-bonded hydrogen atom content of about 0.7 to 0.8 percent by weight.

Organohydrogenpolysiloxane B: a copolymer having the formula $HMe_2SiO[Si(OSiMe_2H)(CH_2CH_2CF_3)O]_bSiMe_2H$ where b has an average value of from 1 to 3.

Organohydrogenpolysiloxane C: an organohydrogenpolysiloxane having the average formula $HMe_2SiO(Me_2SiO)_{15}SiMe_2H$ and having a silicon-bonded hydrogen atom content of about 0.15 to 0.21 percent by weight.

Silica Filler A: a treated fumed silica sold under the trademark CAB-O-SIL TS-720 by Cabot Corporation. The treated fumed silica is a high purity silica which has been treated with a dimethylsilicone fluid. The treated fumed silica has a surface area (BET) of 100±20 m²/g, a carbon content of 5.4±0.6 percent by weight, and a specific gravity of 1.8 g/cm³.

Silica Filler B: an electronic DRAM grade spherical fused silica having an average particle size of 5–8 microns and an average surface area of 3 m²/g.

Additive A: a hydrocarbon solvent sold under the trademark EXXSOL D110 by Exxon Corporation. The solvent consists of a blend of C-13 to C-15 saturated hydrocarbons, including 41 percent by weight of 1,4-bis(1-methylethyl)-2-methylcylcohexane. The solvent has a flash point of 114.4° C., a boiling range of 251 to 269° C., and a viscosity of 0.0028 Pa·s at 25° C.

Additive B: a reaction product of a hydroxy-terminated dimethyl methylvinylsiloxane having an average of two dimethylsiloxane units and two methylvinylsiloxane units per molecule and glycidoxypropyltrimethoxysilane. The product was prepared by reacting equal parts by weight of the siloxane and glycidoxypropyltrimethoxysilane at a temperature of 140° C. for 2 hours in the presence of a potassium catalyst. The reaction mixture was neutralized with bis(dimethylvinylsilyl)vinylphosphonate and devolatilized for two hours at a temperature of 130° C. and a pressure of 6.7 kPa.

Additive C: cottonseed oil.

Additive D: a hydroxyl-terminated polydimethylsiloxane having a viscosity of 38–45 mm²/s at 25° C. and a hydroxyl content of 3.9 to 4.3 percent by weight.

Additive E: a copolymer having the average formula:

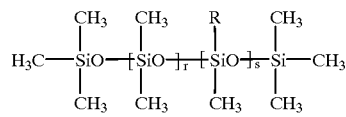

where r is about 169, s is about 23, $R=-CH_2CH_2CH_2(OCH_2CH_2)_t[OCH(CH_3)CH_2]_uOH$, where t is about 10, and u is about 4.

Pigment A: carbon black.

Pigment B: titanium dioxide.

Catalyst: a microencapsulated platinum catalyst containing a platinum complex of 1,3-diethenyl-1,1,3,3-tetramethyldisiloxane encapsulated in a silicone resin consisting of 78 mole percent monophenylsiloxane units and 22 mole percent dimethylsiloxane units, wherein the silicone resin has a glass transition temperature of 60° C.; and a softening temperature of 90° C. The microencapsulated catalyst has an average particle size of 1.8 μm and a platinum content of 0.4 percent by weight.

Inhibitor: 2-Phenyl-3-butyn-2-ol.

Example 1

This example illustrates the preparation of a silicone composition according to the present invention, wherein the thixotropic agent consists of a fumed silica. Resin/Polymer Blend A (100 parts) was heated to 130° C. until flowable, approximately thirty minutes. Silica Filler A (12.82 parts) and 1.71 parts of Pigment B were slowly added to the Resin/Polymer Blend, while the mixture was blended by hand using a spatula. To the mixture was added a blend consisting of 1.08 parts of Organohydrogenpolysiloxane A, 0.61 part of Organohydrogenpolysiloxane C, and 0.01 part of Inhibitor. The mixture was blended by hand using a spatula and then allowed to cool to room temperature. Catalyst (0.10 part) was added to the mixture, which was then blended for about 10 seconds using an AM-501 Hauschild dental mixer. The mixture was blended by hand using a spatula and further blended using the dental mixer for about 10 seconds. The resulting composition had a thixotropy index of 2.05. The composition was cured at 150° C. for 1 hour to form a silicone pressure sensitive adhesive having a tensile adhesion of 1574 grams at 25° C.

Example 2

This example illustrates the preparation of a silicone composition according to the present invention, wherein the thixotropic agent consists of a mixture of a fumed silica and a hydrocarbon blend. Resin/Polymer Blend A (100 parts) was heated to 130° C. until flowable, approximately thirty minutes. Silica Filler A (9.24 parts), 0.33 parts of Pigment A, and 2.25 parts of Additive A were successively added to the Resin/Polymer Blend, while the mixture was blended by hand using a spatula. To the mixture was added a blend consisting of 1.07 parts of Organohydrogenpolysiloxane A, 0.60 part of Organohydrogenpolysiloxane C, and 0.01 part of Inhibitor. The mixture was blended by hand using a spatula and then allowed to cool to room temperature. Catalyst (0.10 part) was added to the mixture, which was then blended for about 10 seconds using an AM-501 Hauschild dental mixer. The mixture was blended by hand using a spatula and further blended using the dental mixer for about 10 seconds. The resulting composition had a thixotropy index of 3.76. The composition was cured at 150° C. for 1 hour to form a silicone pressure sensitive adhesive having a tensile adhesion of 1720 grams at 25° C.

Example 3

A silicone composition according to the present invention was prepared using the method and materials of Example 2, except 1.70 parts of Pigment B was substituted for Pigment A, the amount of Additive A was 2.24 parts, the amount of Organohydrogenpolysiloxane A was 1.18 parts, and Organohydrogenpolysiloxane C was omitted. The resulting composition had a thixotropy index of 3.09. The composition was cured at 150° C. for 1 hour to form a silicone pressure sensitive adhesive having a tensile adhesion of 1663 grams at 25° C.

Example 4

A silicone composition according to the present invention was prepared using the method and materials of Example 2, except the amount of Silica Filler A was 11.79 parts, the amount of Pigment A was 0.34 part, the amount of Additive A was 2.30 parts, the amount of Organohydrogenpolysiloxane A was 1.10 parts, and the amount of Organohydrogenpolysiloxane C was 0.61 part. The resulting composition had a thixotropy index of 4.78. The composition was cured at 150° C. for 1 hour to form a silicone pressure sensitive adhesive having a tensile adhesion of 1517 grams at 25° C.

Example 5

A silicone composition according to the present invention was prepared using the method and materials of Example 2, except the amount of Silica Filler A was 12.33 parts, the amount of Pigment A was 0.24 part, the amount of Additive A was 2.24 parts, the amount of Organohydrogenpolysiloxane A was 1.12 parts, the amount of Organohydrogenpolysiloxane C was 0.61 part, and the amount of Catalyst was 0.11 part. The resulting composition had a thixotropy index of 5.62. The composition was cured at 150° C. for 1 hour to form a silicone pressure sensitive adhesive having a tensile adhesion of 1513 grams at 25° C., a tensile adhesion of 336 grams at 180° C., and a peel adhesion of 57.1 kg/m at 25° C.

Example 6

A silicone composition according to the present invention was prepared using the method and materials of Example 2, except the amount of Silica Filler A was 13.12 parts, 1.75 parts of Pigment B was substituted for Pigment A, the amount of Additive A was 2.33 parts, the amount of Organohydrogenpolysiloxane A was 1.11 parts, the amount of Organohydrogenpolysiloxane C was 0.62 part, and the amount of Catalyst was 0.11 part. The resulting composition had a thixotropy index of 16.61. The composition was cured at 150° C. for 1 hour to form a silicone pressure sensitive adhesive having a tensile adhesion of 1501 grams at 25° C. and 303 grams at 180° C.

Example 7

A silicone composition according to the present invention was prepared using the method and materials of Example 2, except 100 parts of Resin/Polymer Blend B was substituted for Resin/Polymer Blend A, the amount of Silica Filler A was 11.71 parts, 1.19 parts of Pigment B was substituted for Pigment A, 1.64 parts of Organohydrogenpolysiloxane B was substituted for Organohydrogenpolysiloxanes A and C, and the amount of Catalyst was 0.11 part. The resulting composition had a thixotropy index of 3.38. The composition was cured at 150° C. for 1 hour to form a silicone pressure sensitive adhesive having a tensile adhesion of 3035 grams at 25° C. and 1554 grams at 180° C.

Example 8

This example illustrates the preparation of a silicone composition according to the present invention wherein the thixotropic agent consists of a mixture of a fumed silica and a reaction product of a hydroxyl-containing organopolysiloxane and an epoxy-containing alkoxysilane. The composition was prepared using the method and materials of Example 3, except 0.54 part of Additive B was substituted for Additive A, the amount of Pigment B was 1.69 parts, and the amount of Organohydrogenpolysiloxane A was 1.19 parts. The resulting composition had a thixotropy index of 4.52. The composition was cured at 150° C. for 1 hour to form a silicone pressure sensitive adhesive having a tensile adhesion of 422 grams at 180° C.

Example 9

A silicone composition according to the present invention was prepared using the method and materials of Example 8, except the amount of Additive B was 1.09 parts. The resulting composition had a thixotropy index of 5.13. The composition was cured at 150° C. for 1 hour to form a silicone pressure sensitive adhesive having a tensile adhesion of 456 grams at 180° C.

Example 10

A silicone composition according to the present invention was prepared using the method and materials of Example 8, except the amount of Pigment B was 1.70 parts, the amount of Additive B was 2.14 parts, and the amount of Organohydrogenpolysiloxane A was 1.18 parts. The resulting composition had a thixotropy index of 6.01. The composition was cured at 150° C. for 1 hour to form a silicone pressure sensitive adhesive having a tensile adhesion of 531 grams at 180° C.

Example 11

This example illustrates the preparation of a silicone composition according to the present invention, wherein the thixotropic agent consists of a mixture of a fumed silica, a fused silica, and a hydrocarbon blend. The composition was prepared using the method and materials of Example 2, except the amount of Silica Filler A was 11.73 parts, 0.76 part of Silica Filler B was added to the mixture after the addition of Silica Filler A, the amount of Pigment A was 0.24 part, the amount of Organohydrogenpolysiloxane A was 1.12 parts, the amount of Organohydrogenpolysiloxane C was 0.61 part, and the amount of Catalyst was 0.11 part. The resulting composition had a thixotropy index of 4.86. The composition was cured at 150° C. for 1 hour to form a silicone pressure sensitive adhesive having a tensile adhesion of 1622 grams at 25° C.

Example 12

A silicone composition according to the present invention was prepared using the method and materials of Example 11, except the amount of Silica filler A was 11.12 parts and amount of Silica Filler B was 1.50 parts. The resulting composition had a thixotropy index of 4.10.

Example 13

A silicone composition according to the present invention was prepared using the method and materials of Example 11, except the amount of Silica filler A was 10.52 parts, the amount of Silica Filler B was 2.26 parts, the amount of Organohydrogenpolysiloxane A was 1.11 parts, and the amount of Organohydrogenpolysiloxane C was 0.62 part. The resulting composition had a thixotropy index of 3.39.

Example 14

A silicone composition according to the present invention was prepared using the method and materials of Example 11, except the amount of Silica Filler A was 9.91 parts, the amount of Silica Filler B was 3.01 parts, the amount of Organohydrogenpolysiloxane A was 1.11 parts, and the amount of Organohydrogenpolysiloxane C was 0.62 part. The resulting composition had a thixotropy index of 2.48.

Example 15

A silicone composition according to the present invention was prepared using the method and materials of Example 11, except the amount of Silica filler A was 9.30 parts, the amount of Silica Filler B was 3.77 parts, the amount of Organohydrogenpolysiloxane A was 1.11 parts, and the amount of Organohydrogenpolysiloxane C was 0.62 part. The resulting composition had a thixotropy index of 2.23.

Example 16

A silicone composition according to the present invention was prepared using the method and materials of Example 11, except the amount of Silica filler A was 8.69 parts, the amount of Silica Filler B was 4.54 parts, and the amount of Organohydrogenpolysiloxane C was 0.62 part. The resulting composition had a thixotropy index of 2.13. The composition was cured at 150° C. for 1 hour to form a silicone pressure sensitive adhesive having a tensile adhesion of 1679 grams at 25° C.

Example 17

This example illustrates the preparation of a silicone composition according to the present invention, wherein the thixotropic agent consists of a mixture of a fumed silica, a hydrocarbon blend, and a triester of glycerol. The composition was prepared using the method and materials of Example 2, except the amount of Silica Filler A was 9.29 parts, the amount of Pigment A was 0.34 part, the amount of Additive A was 2.26 parts, 0.58 part of Additive C was added to the mixture after the addition of Additive A, and the amount of Organohydrogenpolysiloxane A was 1.08 parts. The resulting composition had a thixotropy index of 6.14. The composition was cured at 150° C. for 1 hour to form a silicone pressure sensitive adhesive having a tensile adhesion of 400 grams at 180° C.

Example 18

This example illustrates the preparation of a silicone composition according to the present invention, wherein the thixotropic agent consists of a mixture of a fumed silica, a hydrocarbon blend, and a hydroxyl-containing organopolysiloxane. The composition was prepared using the method and materials of Example 2, except the amount of Silica Filler A was 9.29 parts, the amount of Pigment A was 0.34 part, the amount of Additive A was 2.26 parts, 0.56 part of Additive D was added to the mixture after the addition of Additive A, and the amount of Organohydrogenpolysiloxane A was 1.08 parts. The resulting composition had a thixotropy index of 8.53. The composition was cured at 150° C. for 1 hour to form a silicone pressure sensitive adhesive having a tensile adhesion of 398 grams at 180° C.

Example 19

A silicone composition according to the present invention was prepared using the method and materials of Example 18, except the amount of Additive A was 9.28 parts and the amount of Additive D was 0.38 part. The resulting composition had a thixotropy index of 6.91. The composition was cured at 150° C. for 1 hour to form a silicone pressure sensitive adhesive having a tensile adhesion of 420 grams at 180° C.

Example 20

A silicone composition according to the present invention was prepared using the method and materials of Example 18, except the amount of Silica Filler A was 9.25 parts, the amount of Pigment A was 0.33 part, the amount of Additive A was 2.25 parts, the amount of Additive D was 0.12 part, and the amount of Organohydrogenpolysiloxane A was 1.07 parts. The resulting composition had a thixotropy index of 5.00. The composition was cured at 150° C. for 1 hour to form a silicone pressure sensitive adhesive having a tensile adhesion of 375 grams at 180° C.

Example 21

This Example demonstrates the preparation of a silicone composition according to the present invention, wherein the thixotropic agent consists of a mixture of a fumed silica, a hydrocarbon blend, and a polydiorganosiloxane-polyoxyalkylene copolymer. The composition was prepared using the method and materials of Example 2, except the amount of Silica Filler A was 9.29 parts, the amount of Pigment A was 0.34 part, the amount of Additive A was 2.26 parts, 0.49 part of Additive E was added to the mixture after the addition of Additive A, and the amount of Organohydrogenpolysiloxane A was 1.08 parts. The resulting composition had a thixotropy index of 6.75. The composition was cured at 150° C. for 1 hour to form a silicone pressure sensitive adhesive having a tensile adhesion of 266 grams at 180° C.

Example 22

This example demonstrates the preparation of a silicone composition according to the present invention, wherein the thixotropic agent consists of a mixture of a fumed silica, a hydrocarbon blend, and a reaction product of a hydroxyl-containing organopolysiloxane and an epoxy-containing alkoxysilane. The composition was prepared using the method and materials of Example 2, except the amount of Silica Filler A was 9.27 parts, the amount of Pigment A was 0.34 part, and 0.28 part of Additive B was added to the mixture after the addition of Additive A. The resulting composition had a thixotropy index of 9.83. The composition was cured at 150° C. for 1 hour to form a silicone pressure sensitive adhesive having a tensile adhesion of 405 grams at 180° C.

Example 23

A silicone composition according to the present invention was prepared using the method and materials of Example 22, except the amount of Silica Filler A was 9.29 parts, the amount of Additive A was 2.26 parts, the amount of Additive B was 0.56 part, and the amount of Organohydrogenpolysiloxane A was 1.08 parts. The resulting composition had a thixotropy index of 8.96. The composition was cured at 150° C. for 1 hour to form a silicone pressure sensitive adhesive having a tensile adhesion of 377 grams at 180° C.

Example 24

A silicone composition according to the present invention was prepared using the method and materials of Example 22, except the amount of Silica Filler A was 9.35 parts, the amount of Additive A was 2.27 parts, the amount of Additive B was 1.12 parts, the amount of Organohydrogenpolysiloxane A was 1.08 parts, and the amount of Organohydrogenpolysiloxane C was 0.61 part. The resulting composition had a thixotropy index of 10.21. The composition was cured at 150° C. for 1 hour to form a silicone pressure sensitive adhesive having a tensile adhesion of 389 grams at 180° C.

Comparative Example 1

A silicone composition outside the scope of the present invention was prepared using the method and materials of Example 3, except Silica Filler A was omitted, Additive A were omitted, the amount of Organohydrogenpolysiloxane A was 1.20 parts, and the amount of Catalyst was 0.11 part. The resulting composition had a thixotropy index of 1.05.

Comparative Example 2

A silicone composition outside the scope of the present invention was prepared using the method and materials of Example 3, except Silica filler A was omitted, the amount of Pigment B was 1.71 parts, the amount of Additive A was 2.05 parts, the amount of Organohydrogenpolysiloxane A was 1.20 parts, and the amount of Catalyst was 0.11 part. The resulting composition had a thixotropy index of 1.05.

That which is claimed is:

1. A silicone composition for preparing a silicone pressure sensitive adhesive, the composition comprising:
    (A) 20 to 55 parts by weight of a polydiorganosiloxane containing an average of at least two silicon-bonded alkenyl groups per molecule;
    (B) 45 to 80 parts by weight of an organopolysiloxane resin comprising $R^3_3SiO_{1/2}$ units and $SiO_{4/2}$ units wherein each $R^3$ is independently selected from the group consisting of monovalent hydrocarbon and monovalent halogenated hydrocarbon groups, the mole ratio of $R^3_3SiO_{1/2}$ units to $SiO_{4/2}$ units is from 0.6:1 to 1.5:1, the resin contains less than about 2 mole percent of alkenyl groups, and the total amount of components (A) and (B) is 100 parts by weight;
    (C) an organohydrogenpolysiloxane having an average of at least two silicon-bonded hydrogen atoms per molecule in an amount sufficient to cure the composition;
    (D) a thixotropic agent in an amount sufficient to impart thixotropy to the composition, wherein the agent is selected from the group consisting of
        (1) at least one silica filler having an average surface area of from 50 to 400 $m^2/g$; and
        (2) a mixture comprising
            (a) at least one silica filler having an average surface area of from 0.5 to 400 $m^2/g$; and
            (b) an additive selected from the group consisting of (i) at least one organopolysiloxane containing an average of at least two silicon-bonded hydroxyl groups and from about 4 to about 40 silicon atoms per molecule, (ii) a reaction product of at least one organopolysiloxane containing an average of at least two silicon-bonded hydroxyl groups and from about 4 to about 40 silicon atoms per molecule, and at least one silane containing at least one silicon-bonded alkoxy group and at least one silicon-bonded epoxy-containing organic group per molecule, (iii) at least one polyether, (iv) at least one poly(vinyl alcohol), (v) at least one polysaccharide, (vi) at least one triester of glycerol, (vii) at least one hydrocarbon free of aliphatic unsaturation, and (viii) a mixture comprising at least two of the aforementioned additives, provided that when the additive is (vii), the composition contains an effective amount of at least one silica filler having a surface area of from 50 to 400 $m^2/g$; and
    (E) a catalytic amount of a hydrosilylation catalyst; wherein the sum of the average number of silicon-bonded alkenyl groups per molecule in component (A) and the average number of silicon-bonded hydrogen atoms per molecule in component (C) is greater than 4.

2. The composition according to claim 1, wherein the polydiorganosiloxane has a viscosity of from 0.2 to 10 Pa·s at 25° C.

3. The composition according to claim 1, wherein the polydiorganosiloxane has the formula $R^2R^1_2SiO(R^1_2SiO)_aSiR^1_2R^2$ wherein each $R^1$ is independently selected from the group consisting of monovalent hydrocarbon and monovalent halogenated hydrocarbon groups free of aliphatic unsaturation, $R^2$ is alkenyl, and n has a value such that the viscosity of the polydiorganosiloxane is from 0.2 to 10 Pa·s at 25° C.

4. The composition according to claim 3, wherein $R^1$ is methyl and $R^2$ is vinyl.

5. The composition according to claim 1, wherein the organopolysiloxane resin comprises $(CH_3)_3SiO_{1/2}$ units and $SiO_{4/2}$ units.

6. The composition according to claim 1, wherein the mole ratio of $R^3_3SiO_{1/2}$ units to $SiO_{4/2}$ units in the organopolysiloxane resin is from 0.65:1 to 0.95:1.

7. The composition according to claim 1, wherein the organopolysiloxane resin is substantially free of alkenyl groups.

8. The composition according to claim 1, wherein the organopolysiloxane resin is present in an amount from 55 to 70 parts by weight per 100 parts by weight of components (A) and (B) combined.

9. The composition according to claim 1, wherein components (A) and (B) are devolatilized.

10. The composition according to claim 1, wherein the organohydrogenpolysiloxane is a copolymer having the formula $HMe_2SiO[Si(OSiMe_2H)(CH_2CH_2CF_3)O]_bSiMe_2H$, wherein b has an average value of from 1 to 3.

11. The composition according to claim 1, wherein the organohydrogenpolysiloxane is present in an amount sufficient to provide from 1.5 to 2 silicon-bonded hydrogen atoms per silicon-bonded alkenyl group in components (A) and (B) combined.

12. The composition according to claim 1, wherein the thixotropic agent is at least one silica filler having an average surface area of from 50 to 400 $m^2/g$.

13. The composition according to claim 12, wherein the silica filler is a fumed silica.

14. The composition according to claim 12, wherein the silica filler is prepared by treating the surface of a silica with an organosilicon compound.

15. The composition according to claim 12, wherein component (D)(1) is present in an amount from about 2 to about 15 parts by weight per 100 parts by weight of components (A) and (B) combined.

16. The composition according to claim 12, wherein the composition further comprises a silica filler having an average surface area less than about 25 $m^2/g$.

17. The composition according to claim 1, wherein the thixotropic agent is component (D)(2).

18. The composition according to claim 17, wherein component (D)(2)(a) is a fumed silica.

19. The composition according to claim 17, wherein component (D)(2)(b) is at least one organopolysiloxane containing an average of at least two silicon-bonded hydroxyl groups and from about 4 to about 40 silicon atoms per molecule.

20. The composition according to claim 17, wherein component (D)(2)(b) is a reaction product of at least one organopolysiloxane containing an average of at least two silicon-bonded hydroxyl groups and from about 4 to about 40 silicon atoms per molecule, and at least one silane containing at least one silicon-bonded alkoxy group and at least one silicon-bonded epoxy-containing organic group per molecule.

21. The composition according to claim 17, wherein component (D)(2)(b) is at least one polydiorganosiloxane-polyoxyalkylene copolymer.

22. The composition according to claim 17, wherein component (D)(2)(b) is at least one triester of glycerol.

23. The composition according to claim 17, wherein component (D)(2)(b) is at least one hydrocarbon free of aliphatic unsaturation.

24. The composition according to claim 23, wherein component (D)(2)(b) is a blend of C-13 to C-15 saturated hydrocarbons.

25. The composition according to claim 17, wherein component (D)(2)(a) is a fumed silica and component (D)(2)(b) is at least one hydrocarbon free of aliphatic unsaturation.

26. The composition according to claim 1, wherein the hydrosilylation catalyst is a microencapsulated hydrosilylation catalyst.

27. The composition according to claim 26, wherein the microencapsulated hydrosilylation catalyst is a microencapsulated platinum catalyst.

28. A silicone pressure sensitive adhesive, comprising a reaction product of the composition of claim 1.

29. A silicone pressure sensitive adhesive, comprising a reaction product of the composition of claim 12.

30. A silicone pressure sensitive adhesive, comprising a reaction product of the composition of claim 17.

31. A multi-part silicone composition for preparing a silicone pressure sensitive adhesive, the composition comprising:

(A) 20 to 55 parts by weight of a polydiorganosiloxane containing an average of at least two silicon-bonded alkenyl groups per molecule;

(B) 45 to 80 parts by weight of an organopolysiloxane resin comprising $R^3{}_3SiO_{1/2}$ units and $SiO_{4/2}$ units wherein each $R^3$ is independently selected from the group consisting of monovalent hydrocarbon and monovalent halogenated hydrocarbon groups, the mole ratio of $R^3{}_3SiO_{1/2}$ units to $SiO_{4/2}$ units is from 0.6:1 to 1.5:1, the resin contains less than about 2 mole percent of alkenyl groups, and the total amount of components (A) and (B) is 100 parts by weight;

(C) an organohydrogenpolysiloxane having an average of at least two silicon-bonded hydrogen atoms per molecule in an amount sufficient to cure the composition;

(D) a thixotropic agent in an amount sufficient to impart thixotropy to the composition, wherein the agent is selected from the group consisting of
  (1) at least one silica filler having an average surface area of from 50 to 400 m²/g; and
  (2) a mixture comprising
    (a) at least one silica filler having an average surface area of from 0.5 to 400 m²/g; and
    (b) an additive selected from the group consisting of (i) at least one organopolysiloxane containing an average of at least two silicon-bonded hydroxyl groups and from about 4 to about 40 silicon atoms per molecule, (ii) a reaction product of at least one organopolysiloxane containing an average of at least two silicon-bonded hydroxyl groups and from about 4 to about 40 silicon atoms per molecule, and at least one silane containing at least one silicon-bonded alkoxy group and at least one silicon-bonded epoxy-containing organic group per molecule, (iii) at least one polyether, (iv) at least one poly(vinyl alcohol), (v) at least one polysaccharide, (vi) at least one triester of glycerol, (vii) at least one hydrocarbon free of aliphatic unsaturation, and (viii) a mixture comprising at least two of the aforementioned additives, provided that when the additive is (vii), the composition contains an effective amount of at least one silica filler having a surface area of from 50 to 400 m²/g; and (E) a catalytic amount of a hydrosilylation catalyst; wherein the sum of the average number of silicon-bonded alkenyl groups per molecule in component (A) and the average number of silicon-bonded hydrogen atoms per molecule in component (C) is greater than 4, and provided neither component (A), nor component (B), when component (B) contains alkenyl groups, art present with components (C) and (E) in the same part.

* * * * *